United States Patent
Mummigatti

(10) Patent No.: US 9,904,264 B2
(45) Date of Patent: Feb. 27, 2018

(54) MULTI-LEVEL DIGITAL PROCESS MANAGEMENT SYSTEM

(71) Applicant: Bank of America Corporation, Charlotte, NC (US)

(72) Inventor: Vinaykumar S. Mummigatti, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 14/710,078

(22) Filed: May 12, 2015

(65) Prior Publication Data

US 2016/0334767 A1    Nov. 17, 2016

(51) Int. Cl.
*G05B 13/02* (2006.01)
*G05B 19/042* (2006.01)

(52) U.S. Cl.
CPC .. *G05B 19/042* (2013.01); *G05B 2219/23292* (2013.01)

(58) Field of Classification Search
CPC ............................. H04L 12/66; H04L 41/145
See application file for complete search history.

(56) References Cited

U.S. PATENT DOCUMENTS

| 6,820,118 | B1 * | 11/2004 | Leymann | G06Q 10/10 709/223 |
| 8,560,455 | B1 * | 10/2013 | Raman | G06F 21/10 705/59 |
| 8,914,656 | B2 * | 12/2014 | Tarkoma | G06F 1/3203 713/320 |
| 2011/0258008 | A1 * | 10/2011 | McNair | G06Q 10/06 705/7.11 |
| 2015/0169808 | A1 * | 6/2015 | Manley | G06F 17/5009 703/21 |
| 2016/0337198 | A1 * | 11/2016 | Mummigatti | H04L 12/66 |

OTHER PUBLICATIONS

Vinaykumar S. Mummigatti, U.S. Appl. No. 14/710,020, "Digital Process Mangement System" patent application filed May 12, 2015.
"Deficits in BPM Maturity to Inhibit Digital Business Strategies: Gartner" by Networks Asia staff, Monday, Jan. 26, 2015.
Book "Internet of Things Process of Everything, BPM Everywhere" Copyright 2015, Edited by Layna Fischer, Published by Future Strategies Inc., in association with the Workflow Management Coaliton (WMC).

* cited by examiner

*Primary Examiner* — Vincent Tran
(74) *Attorney, Agent, or Firm* — Michael A. Springs

(57) ABSTRACT

According to one embodiment, a system for digital process management comprises at least one memory and processor communicatively coupled to one another. The memory is operable to store input data, output data, and a process model, each associated with a digital process management system. The processor is operable to determine the process model, which comprises a set of rules, determine the input data based upon data received from a data source, and determine whether to initiate the process model based upon the input data. The system is further operable to execute the process model across two of an Internet-connected device, a gateway, and an enterprise by determining a state of a process, determining an activity based upon the state and the set of rules, executing the activity, determining results data, and determining the output data based upon the results data. The system is further operable to communicate the output data.

14 Claims, 6 Drawing Sheets

MULTI-LEVEL DIGITAL PROCESS MANAGEMENT SYSTEM

TECHNICAL FIELD

The present disclosure relates generally to process management systems, and more particularly to digital process management systems (DPMS).

BACKGROUND

Process management refers to managing, among other things, the state of a process. The state of a process may comprise identification of a step, for example, the step at which the process is currently operating. The state of a process may also be understood to be a status of the process. Managing the state of a process can be accomplished using a process model, which models a process and may comprise three basic elements: data input, activity/analysis, and data output. In the context of the digital world of the "Internet of things" (IOT) and other electronic components and networks, the location(s) at which process management occurs (and at which process models operate) can affect the effectiveness of processes and create new opportunities to, for example, market products, manage value chains, and expand business opportunities. Digital process management refers to process management in this digital world, and digital process management systems (DPMS) refers to systems that perform digital process management.

SUMMARY

In accordance with the present disclosure, disadvantages and problems associated with process management in digital environments may be reduced or eliminated, and one or more technical advantages may be realized.

According to particular embodiments of the present disclosure, a system comprises at least one memory and at least one processor. The memory is operable to store input data associated with at least one digital process management system (DPMS), output data associated with the at least one DPMS, and a process model associated with the at least one DPMS. The processor is communicatively coupled to the memory and is operable to determine the process model based at least in part upon input received from a user, wherein the process model comprises a set of rules. The processor is further operable to determine the input data based at least in part upon data received from a data source and to determine, based at least in part upon the input data, whether to initiate the process model. Additionally, the processor is operable to execute the process model, wherein executing the process model comprises executing the process model across two of an Internet-connected device, a gateway, and an enterprise. The gateway comprises one of a wired router, wireless router, server, tablet computer, laptop computer, desktop computer, and smartphone, and the enterprise comprises an entity associated with the process model. Executing the process model further comprises determining a state of a process, determining an activity based at least in part upon the state of the process and the set of rules, and executing the activity. Executing the process model also comprises determining results data, wherein the results data is based at least in part upon a result of the executed activity. Furthermore, executing the process model comprises determining the output data, wherein the output data is based at least in part upon the results data. The processor is also operable to communicate the output data to the memory.

Certain embodiments of the present disclosure may provide one or more technical advantages. For example, digital process management systems can help provision goods, services, and information in real time to users of IOT devices and/or gateways. Provisioning can occur in real time (or near-real time), because processes can be managed at or across the IOT device and/or gateway levels, as opposed to being batched and managed solely within an enterprise. In addition, digital process management systems improve the functionality of IOT devices, gateways, and enterprises by bringing process management closer to users. Thus, users may modify process models directly, and in some cases may manage processes without the delay or reduced customizability of enterprise input or control. Furthermore, digital process management may reduce network traffic and/or processing demands, as less data may need to be sent to and from enterprises to enable process management.

In addition, digital process management systems enable process automation, where processes are executed using modifiable and updatable process models that are executed and updated across the device, gateway, and/or enterprise levels. DPMSs also open the door to federated digital process management, which, for example, may allow for the execution of a first process model to affect the execution of a second process model, wherein the second process model may deal with a separate value chain or industry than the first process model. Such federated digital process management may create, for example, better-targeted advertisement, improved customer service, and other benefits that may result in decreased costs, increased revenue, and/or increased customer good will and loyalty.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying example drawings, in which.

DETAILED DESCRIPTION OF THE DRAWINGS

Embodiments of the present disclosure and its advantages are best understood by referring to FIGS. 1-6, like numerals being used for like and corresponding parts of the various drawings.

Process management refers to managing, among other things, the state of a process. The state of a process may comprise identification of a step, for example, the step at which the process is currently operating. The state of a process may also be understood to be a status of the process. Managing the state of a process can be accomplished using a process model, which models a process and may comprise three basic elements: data input, activity/analysis, and data output. In the context of the digital world of the "Internet of things" (IOT) and other electronic components and networks, the location(s) at which process management occurs (and at which process models operate) can affect the effectiveness of processes and create new opportunities to, for example, market products, manage value chains, and expand business opportunities. Digital process management refers to process management in this digital world, and digital process management systems (DPMS) refers to systems that perform digital process management.

A DPMS may operate within or across at least three conceptual digital levels: the IOT device level, the gateway level, and the enterprise level. The IOT device level may include, for example, Internet-connected devices such as smartwatches, smart home and car systems, security systems, etc. The gateway level may include, for example, Internet-connected gateway devices that may be able to connect multiple IOT devices and may have a unique public and/or private IP address, such as routers, smartphones, and servers. The enterprise level may include, for example, a company or organization (including components connected to a network such as the Internet).

Figure 1:
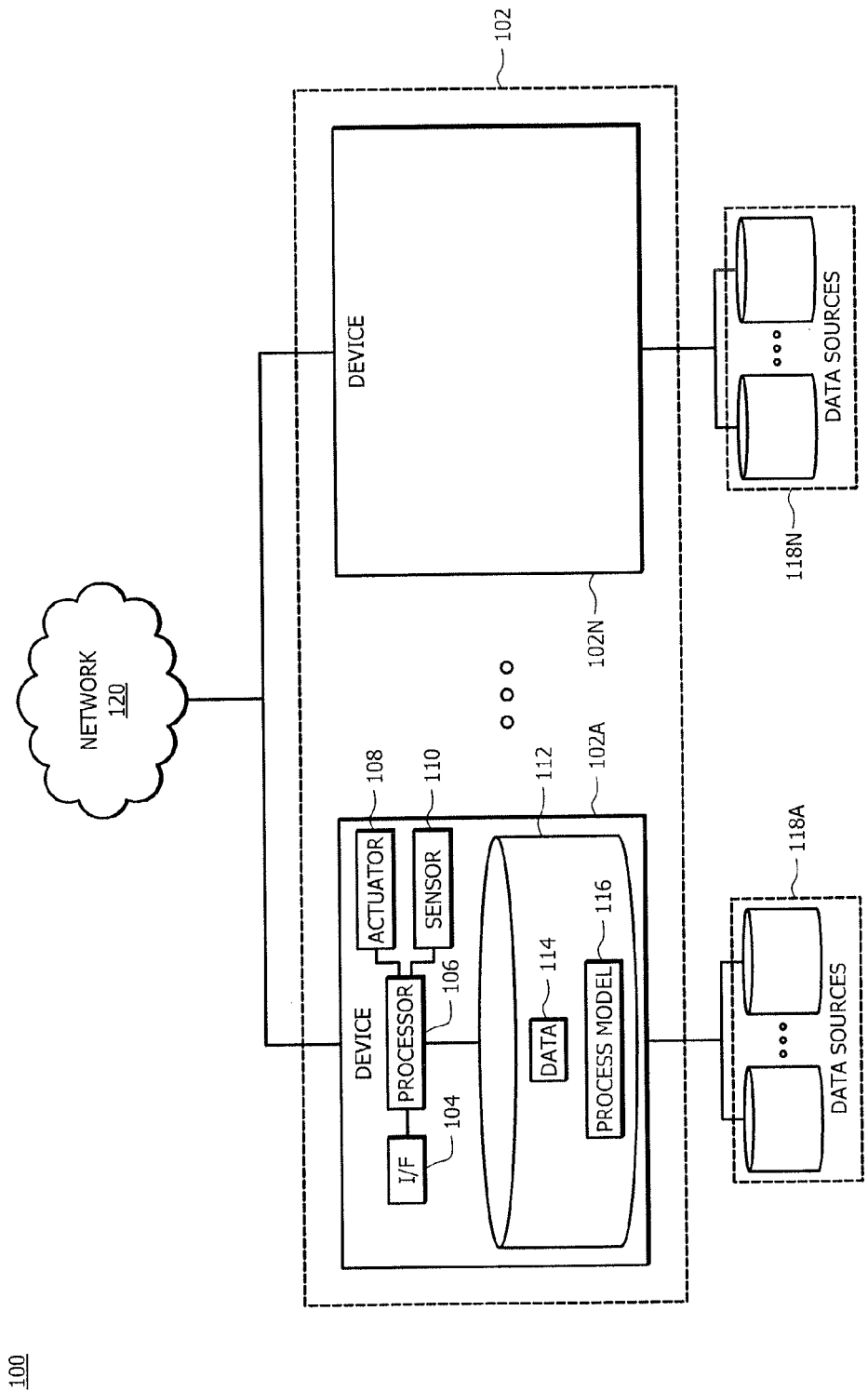
FIG. 1 illustrates a block diagram of an example digital process management system, comprising one or more devices, according to a particular embodiment.

FIG. 1 illustrates a block diagram of an example system 100 that performs digital process management, comprising one or more devices, according to a particular embodiment. System 100 may include devices 102, which may include devices 102A-102N, data sources 118A-118N, and a network 120. Network 120 may communicatively couple devices 102A-102N, data sources 118A-118N, and/or any components contained within or controlled by such devices or data sources.

Network 120 represents any suitable network operable to facilitate communication between the components of system 100, such as devices 102A-102N, and/or any components contained within or controlled by such devices. In particular embodiments, network 120 may also connect the components of system 100 to any other component, system, or entity via, for example, the Internet. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In general, devices 102 may assist in performing digital process management. In particular embodiments, digital process management may include managing a process using a process model. This may include, for example, determining and conducting an activity based on the current state of a process and/or data, which may be done, for example, to accomplish certain goal and/or reach certain outcomes. Furthermore, this may include managing the state of a process to, for example, accomplish certain goal and/or reach certain outcomes. In certain embodiments, the digital process management may occur within a single device 102A, where the process may begin and end in device 102A. In other embodiments, the digital process management may occur across multiple devices 102A-102N, where the process may begin and end within each device 102A-102N or across devices 102A-102N.

Devices 102 may include one or more devices 102A-102N. Devices 102A-102N may refer to any suitable combination of hardware and/or software implemented in one or more modules to process data and provide the described functions and operations. Device 102N may have the same components, characteristics, and/or functions and operations as device 102A. In particular embodiments, device 102A and/or any components thereof may include "Internet of things" (IOT) (or internet-connected) devices, for example, smart watches, smart refrigerators, security systems, smartphones, mobile or cellular telephones, global positioning system (GPS) devices, smart homes, smart cars, smart televisions and home theater equipment, mobile devices, wearable devices, smart meters, motion tracking or object tracking devices (e.g., radio frequency identification (RFID) devices), medical devices, personal computers, laptops, tablets, manufacturing and industrial devices, or any other suitable device operable to communicate with other components in system 100 and process data. In particular embodiments, device 102A may or may not have a unique IP address. More specifically, device 102A may or may not have a unique public IP address and/or private IP address. In particular embodiments, the functions of device 102A may be performed by any suitable combination of one or more devices 102A-102N or other components at one or more locations. In the illustrated embodiment, devices 102A-102N comprise interface (I/F) 104, processor 106, actuator 108, sensor 110, and memory 112, wherein memory 112 stores data 114 and/or process model 116.

Device 102A may comprise interface 104. In general, interface 104 communicates data, including data for performing digital process management, among the other elements of system 100. In certain embodiments, interface 104 may also communicate with other entities associated with network 120. In some embodiments, interface 104 is communicatively coupled to processor 106 and may refer to any suitable component operable to receive input for device 102A, send output from device 102A, perform suitable processing of the input or output or both, communicate to other devices, or any combination of the preceding. In certain embodiments, interface 104 may receive direct input from a user (e.g., via a keyboard, a camera, etc.) and may send output directly to a user (e.g., via a display, a printout, a series of sounds, etc.). Interface 104 may include appropriate hardware (e.g., modem, network interface card, etc.) and software, including protocol conversion and data processing capabilities, to communicate through network 120 or other communication system that allows device 102A to communicate to other components of system 100. Interface 104 may include any suitable software operable to access data from various devices, components, or entities, such a device 102N and data sources 118A-118N, as well as other devices, components, or entities connected to network 120. Interface 104 may include any suitable software operable to transmit data to various devices, components, or entities, such a device 102N and data sources 118A-118N, as well as other devices, components, or entities connected to network 120. Interface 104 may include one or more ports, conversion software, or both.

Device 102A may comprise processor 106. Processor 106 is generally operable to coordinate and/or process digital process management. In particular embodiments, processor 106 may be operable to execute process model 116 and process data 114. Processor 106 may be communicatively coupled to interface 104, actuator 108, sensor 110, and/or memory 112. Processor 106 may comprise any suitable combination of hardware and software to execute instructions and manipulate data to perform the described functions for device 102A. In some embodiments, processor 106 may include, for example, one or more computers, one or more central processing units (CPUs), one or more microprocessors, one or more applications, and/or other logic.

Device 102A may comprise actuator 108. Actuator 108 is generally operable to execute an action regarding the performance of digital process management. In particular embodiments, actuator 108 may perform actions according to an executed process model, such as process model 116. In particular embodiments, actuator 108 may execute physical actions, for example, opening a door, turning on an air conditioner, or injecting medication into a patient. In particular embodiments, actuator 108 may execute non-physical actions, for example, sending a signal to a device or component, turning on a sensor, or initiating the execution of a program. In particular embodiments, processor 106 may execute non-physical actions, for example, communicating an electronic message to another component or device or sending any other signal to accomplish a task. In particular embodiments, actuator 108 is communicatively coupled to processor 106 and/or may be controlled by processor 106. In particular embodiments, actuator 108 may be within device 102A, or actuator 108 may be located remotely (outside device 102A).

Device 102A may comprise sensor 110. Sensor 110 is generally operable to collect data for digital process management. In particular embodiments, sensor 110 may collect data for use in executing a process model, such as process model 116. In particular embodiments, sensor 110 may collect data from physical sources, for example temperature, light intensity, the presence or absence of an object or person in a space, movement, motion, and/or force. In particular embodiments, sensor 110 may collect data from non-physical sources, for example, electronic sources such as components, systems, or entities connected to network 120, databases, and/or other sensors.

Device 102A may comprise memory 112. In general, memory 112 stores data, including input data, output data, results data, data from data sources (e.g., data sources 118A), files, applications, models, and/or other data associated with device 102A. Examples of memory 112 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices or components that store one or more files, lists, tables, or other arrangements of information. In particular embodiments, memory 112 may store data 114. In particular embodiments, memory 112 may store process model 116.

Device 102A may contain data 114. Data 114 may comprise any data useful to support the function or operation of device 102A. In particular embodiments, data 114 may comprise input data, output data, results data, data from data sources (e.g., data sources 118A), and/or files. In particular embodiments, data 114 may comprise any number of databases. In particular embodiments, data 114 may comprise files that assist with the function of device 102A. Data 114, as well as any other data associated with device 102A, including process model 116, may be stored on any suitable device or component capable of storing and facilitating retrieval of such data, for example, memory 112.

Device 102A may comprise process model 116. Process model 116 generally comprises logic, rules, algorithms, code, tables, and/or other suitable instructions for executing any suitable functions regarding the operation of device 102A. In certain embodiments, process model 116 may be executed to perform digital process management, in whole or in part. Process model 116 may also comprise logic, rules, algorithms, code, tables, and/or other suitable instructions for managing the state of a process. In other embodiments, process model 116 may be executed within a single device. Alternatively, process model 116 may be executed across multiple devices, in whole or in part. Process model 116 may also be executed across a device, such as device 102A, and one or more other components, systems, or entities connected to network 120.

In general, data sources 118A-118N may comprise data useful to devices 102A-102N, including any data useful to support the function or operation of device 102A. Data sources 118N may comprise the same types of data as data sources 118A. In particular embodiments, data sources 118A may comprise any data useful to support device 102A in performing digital process management. In other embodiments, data sources 118A may comprise data such as health data (e.g., various vital statistics), browsing patterns, e-commerce behaviors, location tracking (e.g., via radio or cellular trilateration, IP-addresses, global positioning systems, etc.), purchasing patterns, online and/or offline behavior tracking, time and date data, video and/or audio data, inventory data, and/or personnel or employment data. In certain embodiments, data sources 118A may comprise a plurality of independent and/or interconnected data sources. In particular embodiments, the data of data sources 118A may be received by sensor 110, stored on memory 112, stored as part of data 114, processed by processor 106, and/or communicated by interface 104.

A component of system 100 may include one or more of an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the disclosure. For example, system 100 may include any number of devices 102, data sources 118A-118N, and/or networks 120. Particular components may be integrated or separated. Although components of system 100 are illustrated as separate components in FIG. 1, in some embodiments, components of system 100 may share one or more components or be further separated. For example, devices 102A-102N may share a memory, such as memory 112, or other memory accessible through network 120, that may comprise data 114, process model 116, and/or data sources 118A-118N. As another example, process model 116 may be stored in a different location than depicted, such as on device 102N or some other storage location accessible via network 120. Furthermore, process model 116 may not be stored in its entirety in a single location. For example, portions of process model 116 may be stored in different locations, such as on devices 102A-102N, data sources 118A-118N, and/or on some other storage location accessible via network 120. As another example, actuator 108 and/or sensor 110 may be located outside of device 102A and/or may be coupled with other components (of system 100 or otherwise), e.g., in a machine, remote location, or a network-connected facility. In particular embodiments, components of system 100 may be implemented on virtual machines. Moreover, the operations may be performed by more, fewer, or other components and in different configurations. Additionally, any operations, such as executing a process model or performing digital process management, may be performed using any suitable logic comprising software, hardware, and/or other logic. As used in this document, "each" refers to each member of a set or each member of a subset of a set.

Figure 2:
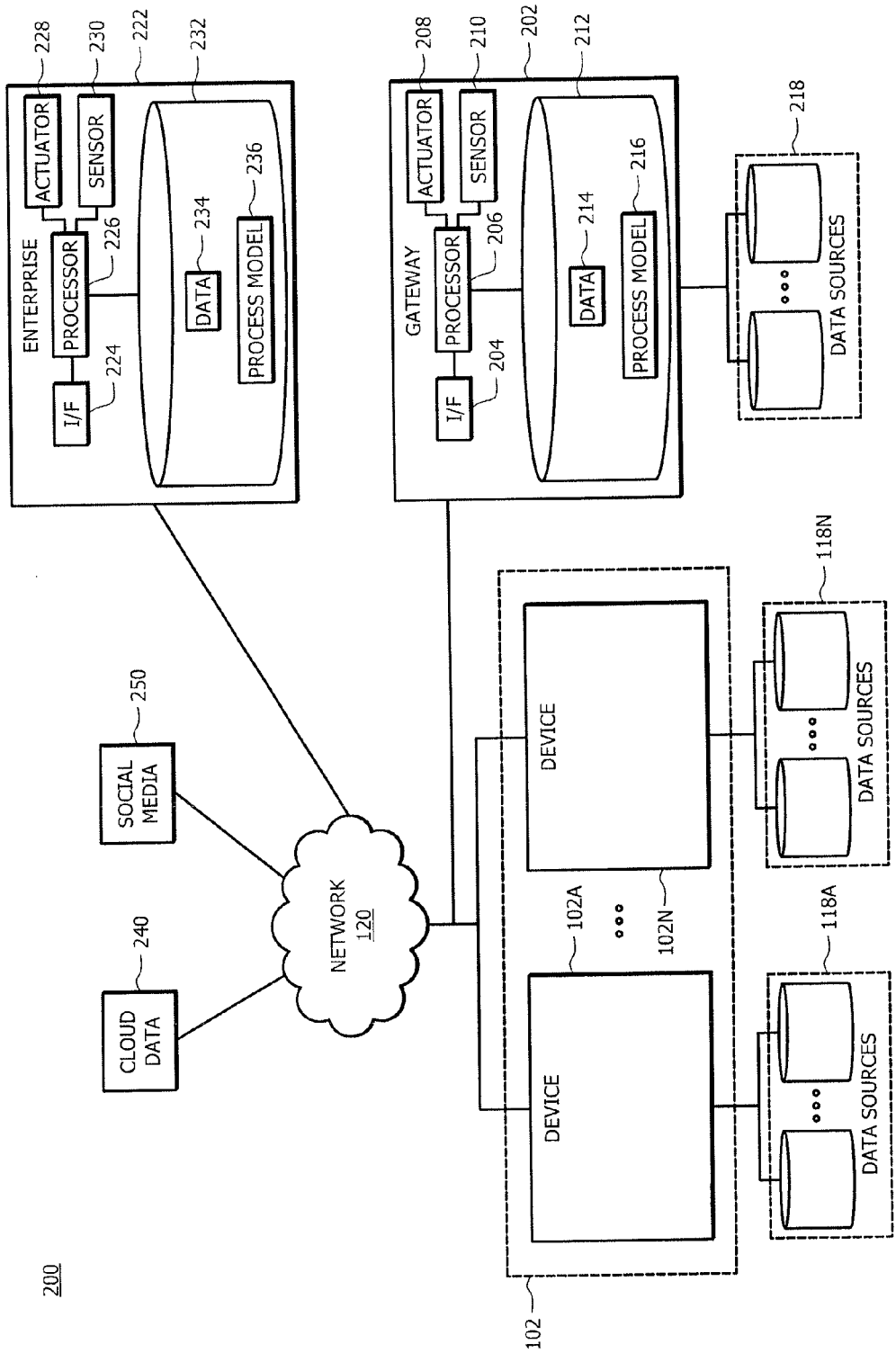
FIG. 2 illustrates a block diagram of an example digital process management system comprising multiple levels, including one or more devices as shown in the system of FIG. 1, a gateway, and an enterprise, according to a particular embodiment.

FIG. 2 illustrates a block diagram of an example digital process management system 200 that performs digital process management, comprising multiple levels, including one or more devices, a gateway, and an enterprise, according to a particular embodiment. In particular embodiments, one or more components of FIG. 1 may be incorporated into all or part of FIG. 2. System 200 may include devices 102, which may include devices 102A-102N, data sources 118A-118N, network 120, a gateway 202, data sources 218, an enterprise 222, cloud data 240, and social media 250. Network 120 may communicatively couple devices 102A-102N, data sources 118A-118N, gateway 202, data sources 218, enterprise 222, cloud data 240, and social media 250, and/or any components contained within or controlled by such devices, data sources, gateways, enterprises, and cloud data and social media components.

In general, gateway 202 may assist in performing digital process management. In particular embodiments, digital process management may include managing a process using a process model. This may include, for example, determining and conducting an activity based on the current state of a process and/or data, which may be done, for example, to accomplish certain goal and/or reach certain outcomes. Furthermore, this may include managing the state of a process to, for example, accomplish certain goal and/or reach certain outcomes. In certain embodiments, the digital process management may occur within a single gateway 202, where the process may begin and end in gateway 202. In other embodiments, the digital process management may occur across multiple gateways 202, where the process may begin and end within each gateway 202 or across multiple gateways 202. The digital process management may also occur across one or more devices 102 and one or more gateways 202, wherein the one or more devices 102 interact through the one or more gateways 202 to manage the process. In these embodiments, the state of the process may be managed at the device level and/or the gateway level.

Gateway 202 may refer to any suitable combination of hardware and/or software implemented in one or more modules to process data and provide the described functions and operations. In particular embodiments, gateway 202 and/or any components thereof may comprise internet-connected components that can be communicatively coupled to one or more devices 102. In certain embodiments, gateway 202 may have a unique IP address. More specifically, gateway 202 may have a unique public IP address and/or private IP address. Gateway 202 may comprise, for example, a wired router, wireless router, server, tablet computer, laptop computer, desktop computer, smartphone, network gateway, or any other suitable component operable to communicate with other components in system 200 and process data. In particular embodiments, the functions of gateway 202 may be performed by any suitable combination of one or more gateways 202 or other components at one or more locations. In the illustrated embodiment, gateway 202 comprises interface (I/F) 204, processor 206, actuator 208, sensor 210, and memory 212, wherein memory 212 stores data 214, and/or process model 216.

Gateway 202 may comprise interface 204. In general, interface 204 communicates data, including data for performing digital process management, among the other elements of system 200. In certain embodiments, interface 204 may also communicate with other entities associated with network 120. In some embodiments, interface 204 is communicatively coupled to processor 206 and may refer to any suitable component operable to receive input for gateway 202, send output from gateway 202, perform suitable processing of the input or output or both, communicate to other components, or any combination of the preceding. In certain embodiments, interface 204 may receive direct input from a user (e.g., via a keyboard, a camera, etc.) and may send output directly to a user (e.g., via a display, a printout, a series of sounds, etc.). Interface 204 may include appropriate hardware (e.g., modem, network interface card, etc.) and software, including protocol conversion and data processing capabilities, to communicate through network 120 or other communication system that allows gateway 202 to communicate to other components of system 200. Interface 204 may include any suitable software operable to access data from various devices, components, or entities, such a devices 102, data sources 218, enterprise 222, could data 240, social media 250, as well as other devices, components, or entities connected to network 120. Interface 204 may include any suitable software operable to transmit data to various devices, components, or entities, such a devices 102, data sources 218, enterprise 222, could data 240, social media 250, as well as other devices, components, or entities connected to network 120. Interface 204 may include one or more ports, conversion software, or both.

Gateway 202 may comprise processor 206. Processor 206 is generally operable to coordinate and/or process digital process management. In particular embodiments, processor 206 may be operable to execute process model 216 and process data 214. Processor 206 may be communicatively coupled to interface 204, actuator 208, sensor 210, and/or memory 212. Processor 206 may comprise any suitable combination of hardware and software to execute instructions and manipulate data to perform the described functions for gateway 202. In some embodiments, processor 206 may include, for example, one or more computers, one or more central processing units (CPUs), one or more microprocessors, one or more applications, and/or other logic.

Gateway 202 may comprise actuator 208. Actuator 208 is generally operable to execute an action regarding the performance of digital process management. In particular embodiments, actuator 208 may perform actions according to an executed process model, such as process model 216. In particular embodiments, actuator 208 may execute physical actions, for example, opening a door, turning on an air conditioner, or injecting medication into a patient. In particular embodiments, actuator 208 may execute non-physical actions, for example, sending a signal to a device or component, turning on a sensor, or initiating the execution of a program. In particular embodiments, processor 206 may execute non-physical actions, for example, communicating an electronic message to another component or device or sending any other signal to accomplish a task. In particular embodiments, actuator 208 is communicatively coupled to processor 206 and/or may be controlled by processor 206. In particular embodiments, actuator 208 may be within gateway 202, or actuator 208 may be located remotely (outside gateway 202).

Gateway 202 may comprise sensor 210. Sensor 210 is generally operable to collect data for digital process management. In certain embodiments, sensor 210 may collect data for use in executing a process model, such as process model 216. Sensor 210 may also collect data from physical sources, for example temperature, light intensity, the presence or absence of an object or person in a space, movement, motion, and/or force. In other embodiments, sensor 210 may collect data from non-physical sources, for example, electronic sources such as components, systems, or entities connected to network 120, databases, and/or other sensors.

Gateway 202 may comprise memory 212. In general, memory 212 stores data, including input data, output data, results data, data from data sources (e.g., data sources 218), files, applications, models, and/or other data associated with gateway 202. Examples of memory 212 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices or components that store one or more files, lists, tables, or other arrangements of information. In particular embodiments, memory 212 may store data 214. Memory 212 may also store process model 216.

Gateway 202 may contain data 214. Data 214 may comprise any data useful to support the function or operation of gateway 202. In certain embodiments, data 214 may comprise input data, output data, results data, data from data sources (e.g., data sources 218), and/or files. In other embodiments, data 214 may comprise any number of databases. Additionally, data 214 may comprise data from cloud data 240 and/or social media 250. In particular embodiments, data 214 may comprise files that assist with the function of gateway 202. Data 214, as well as any other data associated with gateway 202, including process model 216, may be stored on any suitable device or component capable of storing and facilitating retrieval of such data, for example, memory 212.

Gateway 202 may comprise process model 216. Process model 216 generally comprises logic, rules, algorithms, code, tables, and/or other suitable instructions for executing any suitable functions regarding the operation of gateway 202. In certain embodiments, process model 216 may be executed to perform digital process management, in whole or in part. Additionally, process model 216 may comprise logic, rules, algorithms, code, tables, and/or other suitable instructions for managing the state of a process. In particular embodiments, process model 216 may comprise some or all of process model 116, and vice versa. Process model 216 may also be the same as process model 116. In other embodiments, process model 216 may be executed within a single gateway. Process model 216 may also be executed across multiple gateways, in whole or in part. In certain embodiments, process model 216 may be executed across a gateway, such as gateway 202, and one or more other components, systems, or entities connected to network 120.

In general, data sources 218 may comprise data useful to gateway 202, including any data useful to support the function or operation of gateway 202. In certain embodiments, data sources 218 may comprise the same types of data as data sources 118. Data sources 218 may also comprise any data useful to support gateway 202 in performing digital process management. In particular embodiments, data sources 218 may comprise data such as health data (e.g., various vital statistics), browsing patterns, e-commerce behaviors, location tracking (e.g., via radio or cellular trilateration, IP-addresses, global positioning systems, etc.), purchasing patterns, online and/or offline behavior tracking, time and date data, video and/or audio data, inventory data, and/or personnel or employment data. In other embodiments, data sources 218 may comprise a plurality of independent and/or interconnected data sources. Additionally, the data of data sources 218 may be received by sensor 210, stored on memory 212, stored as part of data 214, processed by processor 206, and/or communicated by interface 204.

In general, enterprise 222 may assist in performing digital process management. In particular embodiments, digital process management may include managing a process using a process model. This may include, for example, determining and conducting an activity based on the current state of a process and/or data, which may be done, for example, to accomplish certain goal and/or reach certain outcomes. Furthermore, this may include managing the state of a process to, for example, accomplish certain goal and/or reach certain outcomes. In other embodiments, the digital process management may occur across multiple enterprises 222, where the process may begin and end within each enterprise 222 or across multiple enterprises 222. Digital process management may also occur across one or more devices 102, one or more gateways 202, and/or one or more enterprises 222. In these embodiments, the state of the process may be managed at the device level, the gateway level, and/or the enterprise level.

Enterprise 222 may refer to any entity comprising a suitable combination of hardware and/or software implemented in one or more modules to process data and provide the described functions and operations. Enterprise 222 and/or any components thereof may comprise internet-connected components that can be communicatively coupled to one or more devices 102 and/or one or more gateways 202. Enterprise 222 may or may not have a unique IP address. More specifically, enterprise 222 may have a unique public IP address and/or private IP address. Enterprise 222 may comprise, for example, a company, partnership, organization, association, person, user, group of users, agency, or any other entity comprising any suitable component operable to communicate with other components in system 200 and process data. In particular embodiments, enterprise 222 may be the creator and/or manager of the digital process management system. Enterprise 222 may also be the creator and/or manager of a process model used in the digital process management function of system 200. In certain embodiments, enterprise 222 may comprise a company that distributes a process model, such as process models 116 and/or 216, to devices 102 and/or gateways 202, respectively. The functions of enterprise 222 may be performed by any suitable combination of one or more enterprise 222 or other components at one or more locations. In the illustrated embodiment, enterprise 222 comprises interface (I/F) 224, processor 226, actuator 228, sensor 230, and memory 232, wherein memory 232 stores data 234, and/or process model 236.

Enterprise 222 may comprise interface 224. In general, interface 224 communicates data, including data for performing digital process management, among the other elements of system 200. In certain embodiments, interface 224 may also communicate with other entities associated with network 120. In some embodiments, interface 224 is communicatively coupled to processor 226 and may refer to any suitable component operable to receive input for enterprise 222, send output from enterprise 222, perform suitable processing of the input or output or both, communicate to other components, or any combination of the preceding. In certain embodiments, interface 224 may receive direct input from a user (e.g., via a keyboard, a camera, etc.) and may send output directly to a user (e.g., via a display, a printout, a series of sounds, etc.). Interface 224 may include appropriate hardware (e.g., modem, network interface card, etc.) and software, including protocol conversion and data processing capabilities, to communicate through network 120 or other communication system that allows enterprise 222 to communicate to other components of system 200. Interface 224 may include any suitable software operable to access data from various devices, components, or entities, such a devices 102, gateways 202, enterprises 222, could data 240, and social media 250, as well as other devices, components, or entities connected to network 120. Interface 224 may include any suitable software operable to transmit data to various devices, components, or entities, such a devices 102, gateways 202, enterprises 222, could data 240, and social media 250, as well as other devices, components, or entities connected to network 120. Interface 224 may include one or more ports, conversion software, or both.

Enterprise 222 may comprise processor 226. Processor 226 is generally operable to coordinate and/or process digital process management. In particular embodiments, processor 226 may be operable to execute process model 236 and process data 234. Processor 226 may be communicatively coupled to interface 224, actuator 228, sensor 230, and/or memory 232. Processor 226 may comprise any suitable combination of hardware and software to execute instructions and manipulate data to perform the described functions for enterprise 222. In some embodiments, processor 226 may include, for example, one or more computers, one or more central processing units (CPUs), one or more microprocessors, one or more applications, and/or other logic.

Enterprise 222 may comprise actuator 228. Actuator 228 is generally operable to execute an action regarding the performance of digital process management. In particular embodiments, actuator 228 may perform actions according to an executed process model, such as process model 236. In particular embodiments, actuator 228 may execute physical actions, for example, opening a door, turning on an air conditioner, or injecting medication into a patient. In particular embodiments, actuator 228 may execute non-physical actions, for example, sending a signal to a device or component, turning on a sensor, or initiating the execution of a program. In particular embodiments, processor 226 may execute non-physical actions, for example, communicating an electronic message to another component or device or sending any other signal to accomplish a task. In particular embodiments, actuator 228 is communicatively coupled to processor 226 and/or may be controlled by processor 226. In particular embodiments, actuator 228 may be within enterprise 222, or actuator 228 may be located remotely (outside enterprise 222).

Enterprise 222 may comprise sensor 230. Sensor 230 is generally operable to collect data for digital process management. In particular embodiments, sensor 230 may collect data for use in executing a process model, such as process model 236. In particular embodiments, sensor 230 may collect data from physical sources, for example temperature, light intensity, the presence or absence of an object or person in a space, movement, motion, and/or force. In particular embodiments, sensor 230 may collect data from non-physical sources, for example, electronic sources such as components, systems, or entities connected to network 120, databases, and/or other sensors.

Enterprise 222 may comprise memory 232. In general, memory 232 stores data, including input data, output data, results data, data from data sources, files, applications, models, and/or other data associated with enterprise 222. Examples of memory 232 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices or components that store one or more files, lists, tables, or other arrangements of information. In particular embodiments, memory 232 may store data 234. Memory 232 may also store process model 236.

Enterprise 222 may contain data 234. Data 234 may comprise any data useful to support the function or operation of enterprise 222. In certain embodiments, data 234 may comprise input data, output data, results data, data from data sources, and/or files. Data 234 may also comprise any number of databases. Additionally, data 234 may comprise data from cloud data 240 and/or social media 250. In particular embodiments, data 234 may comprise files that assist with the function of enterprise 222. Data 234, as well as any other data associated with enterprise 222, including process model 236, may be stored on any suitable device or component capable of storing and facilitating retrieval of such data, for example, memory 232.

Enterprise 222 may comprise process model 236. Process model 236 generally comprises logic, rules, algorithms, code, tables, and/or other suitable instructions for executing any suitable functions regarding the operation of enterprise 222. In certain embodiments, process model 236 may be executed to perform digital process management, in whole or in part. Process model 236 may also comprise logic, rules, algorithms, code, tables, and/or other suitable instructions for managing the state of a process. Additionally, process model 236 may comprise some or all of process model 116, and vice versa. In other embodiments, process model 236 may comprise some or all of process model 216, and vice versa. In addition, process model 236 may be the same as process model 116 and/or process model 216. Process model 236 may also be executed across multiple enterprises, in whole or in part. In certain embodiments, process model 236 may be executed across (1) one or more devices, such as devices 102, (2) one or more gateways, such as gateway 202, (3) one or more enterprises, such as enterprise 222, and/or (4) one or more other components, systems, or entities connected to network 120.

Cloud data 240 may refer to any collection of data accessible via network 120 that is suitable for use in system 200. Cloud data 240 may comprise any data useful to support the function or operation of system 200. In particular embodiments, cloud data 240 may comprise (and/or exist on) a network server, any suitable remote server, a mainframe, a host computer, a workstation, a web server, a personal computer, a file server, database, or any other suitable component operable to communicate with other components in system 200 and store data. In other embodiments, the functions of cloud data 240 may be performed by any suitable combination of one or more servers or other components at one or more locations. In embodiments where cloud data 240 is a server, the server may be a private server, and the server may be a virtual or physical server. In certain embodiments, cloud data 240 may store some or all of data sources 118A-118N, data sources 218, data 114, data 214, and/or data 234. Additionally, cloud data 240 may be a data source and comprise some or all of the data in data sources 118A-118N, data sources 218, data 114, data 214, and/or data 234. In other embodiments, devices 102, gateways 202, and/or enterprises 222 may use cloud data 240 when performing digital process management, including when executing process models 116, 216, and/or 236.

Social media 250 may refer to any collection of entities communicatively coupled to network 120 (either directly or indirectly). Social media 250 may comprise any data, and/or means of analyzing data, useful to support the function or operation of system 200. In certain embodiments, social media 250 may comprise a number of devices 202 interconnected and sharing data. Social media 250 may also comprise a website and/or application having multiple users, for example, Facebook®, Twitter®, eHarmony®, etc. In other embodiments, social media 250 may store some or all of data sources 118A-118N, data sources 218, data 114, data 214, and/or data 234. In particular embodiments, social media 250 may be a data source and comprise some or all of the data in data sources 118A-118N, data sources 218, data 114, data 214, and/or data 234. In addition, devices 102, gateways 202, and/or enterprises 222 may use social media 250 when performing digital process management, including when executing process models 116, 216, and/or 236.

A component of system 200 may include one or more of an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the disclosure. For example, system 200 may include any number of devices 102, data sources 118A-118N, networks 120, gateways 202, data sources 218, enterprises 222, cloud data 240, and social media 250. Particular components may be integrated or separated. Although components of system 200 are illustrated as separate components in FIG. 2, in some embodiments, components of system 200 may share one or more components or be further separated. For example, devices 102A-102N may share a memory, such as memory 112, or other memory accessible through network 120, that may comprise data 114, process model 116, and/or data sources 118A-188N. As another example, process models 116, 216, and/or 236 may be stored in a different location than depicted, such as on device 102N, gateway 202, cloud data 240, or some other storage location accessible via network 120. Furthermore, process models 116, 216, and/or 236 may not be stored in their entirety in a single location. For example, portions of process models 116, 216, and/or 236 may be stored in different locations, such as on devices 102A-102N, data sources 118A-118N, gateways 202, enterprises 222, cloud data 240, social media 250, and/or on some other storage location accessible via network 120. As another example, actuator 208 and/or sensor 210 may be located outside of gateway 202 and/or may be coupled with other components (of system 200 or otherwise), e.g., in a machine, remote location, or a network-connected facility. Additionally, actuator 228 and/or sensor 230 may be located outside of enterprise 222 and/or may be coupled with other components (of system 200 or otherwise), e.g., in a machine, remote location, or a network-connected facility. In particular embodiments, components of system 200 may be implemented on virtual machines. Moreover, the operations may be performed by more, fewer, or other components and in different configurations. Additionally, any operations, such as executing a process model or performing digital process management, may be performed using any suitable logic comprising software, hardware, and/or other logic. As used in this document, "each" refers to each member of a set or each member of a subset of a set.

Figure 3:
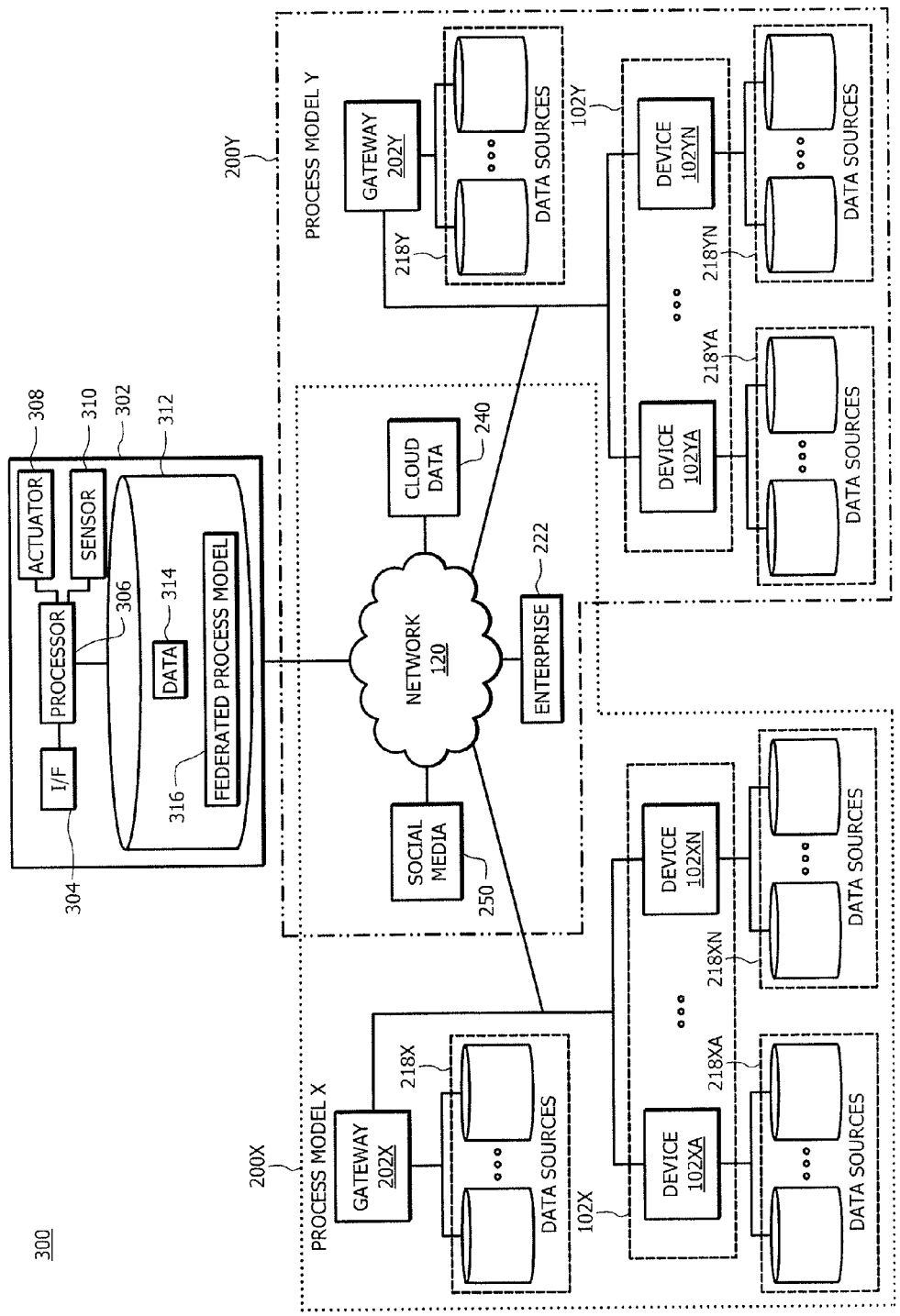
FIG. 3 illustrates a block diagram of an example federated digital process management system, including the systems of FIGS. 1 and 2, according to a particular embodiment.

FIG. 3 illustrates a block diagram of an example digital process management system 300 that performs federated digital process management, according to a particular embodiment. In certain embodiments, one or more components of FIGS. 1 and/or 2 may be incorporated into all or part of FIG. 3. System 300 may include network 120, a system 200X, a system 200Y, and a federated process management module (FPMM) 302. Network 120 may communicatively couple FPMM 302, the components of system 200X and system 200Y, and/or any components contained within or controlled by such modules or systems.

In general, each of system 200X and system 200Y has the same functions, operations, and components as system 200 in FIG. 2. Within FIG. 3, identifiers that differ from the identifiers of system 200 because of the presence of an "X" or a "Y" denote components of system 200 that have been replicated in FIG. 3 to illustrate two systems 200 (an "X" version and a "Y" version). In certain embodiments, system 200X and system 200Y may represent two different instances of digital process management, which may occur on the same system or on different systems, wherein system 200X and system 200Y may comprise some or all of the same components as system 200. In other embodiments, system 200X executes process model X and system 200Y executes process model Y. In particular embodiments, process model X may or may not be the same as process model Y. System 300 may also comprise additional systems (e.g., 200Z, etc.), which may or may not comprise the same components as system 200.

In general, FPMM 302 may assist in performing digital process management, and in particular may perform federated digital process management. In certain embodiments, FPMM 302 may perform digital process management in response to one or more previous instances of digital process management. FPMM 302 may also coordinate one or more instances of digital process management, wherein such coordination may comprise FPMM 302 conducting a separate instance digital process management. Digital process management may include managing a process using a process model. This may include, for example, determining and conducting an activity based on the current state of the process and/or data, which may be done, for example, to accomplish certain goal and/or reach certain outcomes. Furthermore, this may include managing the state of a process to, for example, accomplish certain goal and/or reach certain outcomes. In some embodiments, digital process management may occur across multiple systems (e.g., 200X, 200Y, etc.) and/or multiple enterprises 222, where the process may begin and end within each system 200 and/or enterprise 222 or across multiple systems 200 and/or enterprises 222. Digital process management may also occur across one or more devices 102, one or more gateways 202, one or more enterprises 222, and/or one or more FPMM 302. In these embodiments, the state of a process may be managed at the device level, the gateway level, the enterprise level, and/or at the FPMM, which may exist at any level. Additionally, FPMM 302 may manage the state of one or more processes occurring in one or more systems 200 and/or initiate and manage the state of a new process initiated in response to a previous instance of digital process management.

FPMM 302 may refer to any suitable combination of hardware and/or software implemented in one or more modules to process data and provide the described functions and operations. In some embodiments, FPMM 302 and/or any components thereof may comprise internet-connected components that can be communicatively coupled to one or more components of system 300 (e.g., system 200X and/or 200Y). Additionally, FPMM 302 may have a unique IP address. More specifically, FPMM 302 may have a unique public IP address and/or private IP address. FPMM 302 may also comprise, for example, a company, partnership, organization, association, person, user, group of users, agency, or any other entity comprising any suitable component operable to communicate with other components in system 300 and process data. In particular embodiments, FPMM 302 may exist within (either physically or within the control of) one or more enterprises 222. FPMM 302 may also comprise, for example, a wired router, wireless router, server, tablet computer, laptop computer, desktop computer, smartphone, network gateway, or any other suitable component operable to communicate with other components in system 300 and process data. In certain embodiments, the functions of FPMM 302 may be performed by any suitable combination of one or more FPMMs 302, enterprises 222, gateways 202, devices 102, and/or other components at one or more locations. In the illustrated embodiment, FPMM 302 comprises interface (I/F) 304, processor 306, actuator 308, sensor 310, and memory 312, wherein memory 312 stores data 314, and/or process model 316.

FPMM 302 may comprise interface 304. In general, interface 304 communicates data, including data for performing digital process management, among the other elements of system 300. In certain embodiments, interface 304 may also communicate with other entities associated with network 120. In some embodiments, interface 304 is communicatively coupled to processor 306 and may refer to any suitable component operable to receive input for FPMM 302, send output from FPMM 302, perform suitable processing of the input or output or both, communicate to other components, or any combination of the preceding. In certain embodiments, interface 304 may receive direct input from a user (e.g., via a keyboard, a camera, etc.) and may send output directly to a user (e.g., via a display, a printout, a series of sounds, etc.). Interface 304 may include appropriate hardware (e.g., modem, network interface card, etc.) and software, including protocol conversion and data processing capabilities, to communicate through network 120 or other communication system that allows FPMM 302 to communicate to other components of system 300. Interface 304 may include any suitable software operable to access data from various devices, components, or entities, such a devices 102, gateways 202, enterprises 222, could data 240, social media 250, and FPMMs 302, as well as other devices, components, or entities connected to network 120. Interface 304 may include any suitable software operable to transmit data to various devices, components, or entities, such a devices 102, gateways 202, enterprises 222, could data 240, social media 250, and FPMM 302, as well as other devices, components, or entities connected to network 120. Interface 304 may include one or more ports, conversion software, or both.

FPMM 302 may comprise processor 306. Processor 306 is generally operable to coordinate and/or process digital process management. In particular embodiments, processor 306 may be operable to execute federated process model 316 and process data 314. Processor 306 may be communicatively coupled to interface 304, actuator 308, sensor 310, and/or memory 312. Processor 306 may comprise any suitable combination of hardware and software to execute instructions and manipulate data to perform the described functions for FPMM 302. In some embodiments, processor 306 may include, for example, one or more computers, one or more central processing units (CPUs), one or more microprocessors, one or more applications, and/or other logic.

FPMM 302 may comprise actuator 308. Actuator 308 is generally operable to execute an action regarding the performance of digital process management. In particular embodiments, actuator 308 may perform actions according to an executed process model, such as federated process model 316. In particular embodiments, actuator 308 may execute physical actions, for example, opening a door, turning on an air conditioner, or injecting medication into a patient. In particular embodiments, actuator 308 may execute non-physical actions, for example, sending a signal to a device or component, turning on a sensor, or initiating the execution of a program. In particular embodiments, processor 306 may execute non-physical actions, for example, communicating an electronic message to another component or device or sending any other signal to accomplish a task. In particular embodiments, actuator 308 is communicatively coupled to processor 306 and/or may be controlled by processor 306. In particular embodiments, actuator 308 may be within FPMM 302, or actuator 308 may be located remotely (outside FPMM 302).

FPMM 302 may comprise sensor 310. Sensor 310 is generally operable to collect data for digital process management. In particular embodiments, sensor 310 may collect data for use in executing a process model, such as federated process model 316. In particular embodiments, sensor 310 may collect data from physical sources, for example temperature, light intensity, the presence or absence of an object or person in a space, movement, motion, and/or force. In particular embodiments, sensor 310 may collect data from non-physical sources, for example, electronic sources such as components, systems, or entities connected to network 120, databases, and/or other sensors.

FPMM 302 may comprise memory 312. In general, memory 312 stores data, including input data, output data, results data, federated input data, federated output data, federated results data, data from data sources, files, applications, models, and/or other data associated with FPMM 302. Examples of memory 312 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices or components that store one or more files, lists, tables, or other arrangements of information. In particular embodiments, memory 312 may store data 314. Memory 312 may also store federated process model 316.

FPMM 302 may contain data 314. Data 314 may comprise any data useful to support the function or operation of FPMM 302. In certain embodiments, data 314 may comprise input data, output data, results data, federated input data, federated output data, federated results data, data from data sources, files, and/or other data. Additionally, data 314 may comprise any number of databases. In some embodiments, data 314 may comprise data from cloud data 240 and/or social media 250. Data 314 may also comprise files that assist with the function of FPMM 302. Data 314, as well as any other data associated with FPMM 302, including federated process model 316, may be stored on any suitable device or component capable of storing and facilitating retrieval of such data, for example, memory 312.

FPMM 302 may comprise federated process model 316. Federated process model 316 generally comprises logic, rules, algorithms, code, tables, and/or other suitable instructions for executing any suitable functions regarding the operation of FPMM 302. In particular embodiments, federated process model 316 may be executed to perform digital process management, in whole or in part. In other embodiments, federated process model 316 may comprise logic, rules, algorithms, code, tables, and/or other suitable instructions for managing the state of a process. Federated process model 316 may comprise some or all of process model 116, and vice versa. Additionally, federated process model 316 may comprise some or all of process model 216, and vice versa. Federated process model 316 may also comprise some or all of process model 236, and vice versa. In certain embodiments, federated process model 316 may be the same as process model 116, process model 216, and or process model 236. Federated process model 316 may be executed across multiple enterprises and/or multiple FPMMs 302, in whole or in part. Additionally, federated process model 316 may be executed across (1) one or more devices, such as devices 102, (2) one or more gateways, such as gateway 202, (3) one or more enterprises, such as enterprise 222, (4) one or more FPMMs, such as FPMM 302, and/or (5) one or more other components, systems, or entities connected to network 120.

A component of system 300 may include one or more of an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the disclosure. For example, system 300 may include any number of systems 200 (e.g., system 200X and system 200Y), including any components therein, such as devices 102, data sources 118A-118N, networks 120, gateways 202, data sources 218, enterprises 222, cloud data 240, and social media 250. Similarly, system 300 may include any number of FPMMs 302. Particular components of system 300 may be integrated or separated. Although components of system 300 are illustrated as separate components in FIG. 3 (and as incorporated in FIG. 2), in some embodiments, components of system 300 may share one or more components or be further separated. For example, devices 102A-102N may share a memory, such as memory 112, or other memory accessible through network 120, that may comprise data 114, process model 116, and/or data sources 118A-188N. As another example, process models 116, 216, and/or 236 and/or federated process model 316 may be stored in different locations than depicted, such as on device 102N, gateway 202, enterprise 222, cloud data 240, social media 250, FPMM 302, and/or some other storage location accessible via network 120. Furthermore, process models 116, 216, and/or 236 and/or federated process model 316 may not be stored in their entirety in a single location. For example, portions of process models 116, 216, and/or 236 and/or federated process model 316 may be stored in different locations, such as on devices 102A-102N, data sources 118A-118N, gateways 202, enterprises 222, cloud data 240, social media 250, FPMM 302, and/or on some other storage location accessible via network 120. As another example, actuator 308 and/or sensor 310 may be located outside of FPMM 302 and/or may be coupled with other components (of system 300 or otherwise), e.g., in a machine, remote location, or a network-connected facility. In particular embodiments, components of system 300 may be implemented on virtual machines. Moreover, the operations may be performed by more, fewer, or other components and in different configurations. Additionally, any operations, such as executing a process model or performing digital process management, may be performed using any suitable logic comprising software, hardware, and/or other logic. As used in this document, "each" refers to each member of a set or each member of a subset of a set.

Figure 4:
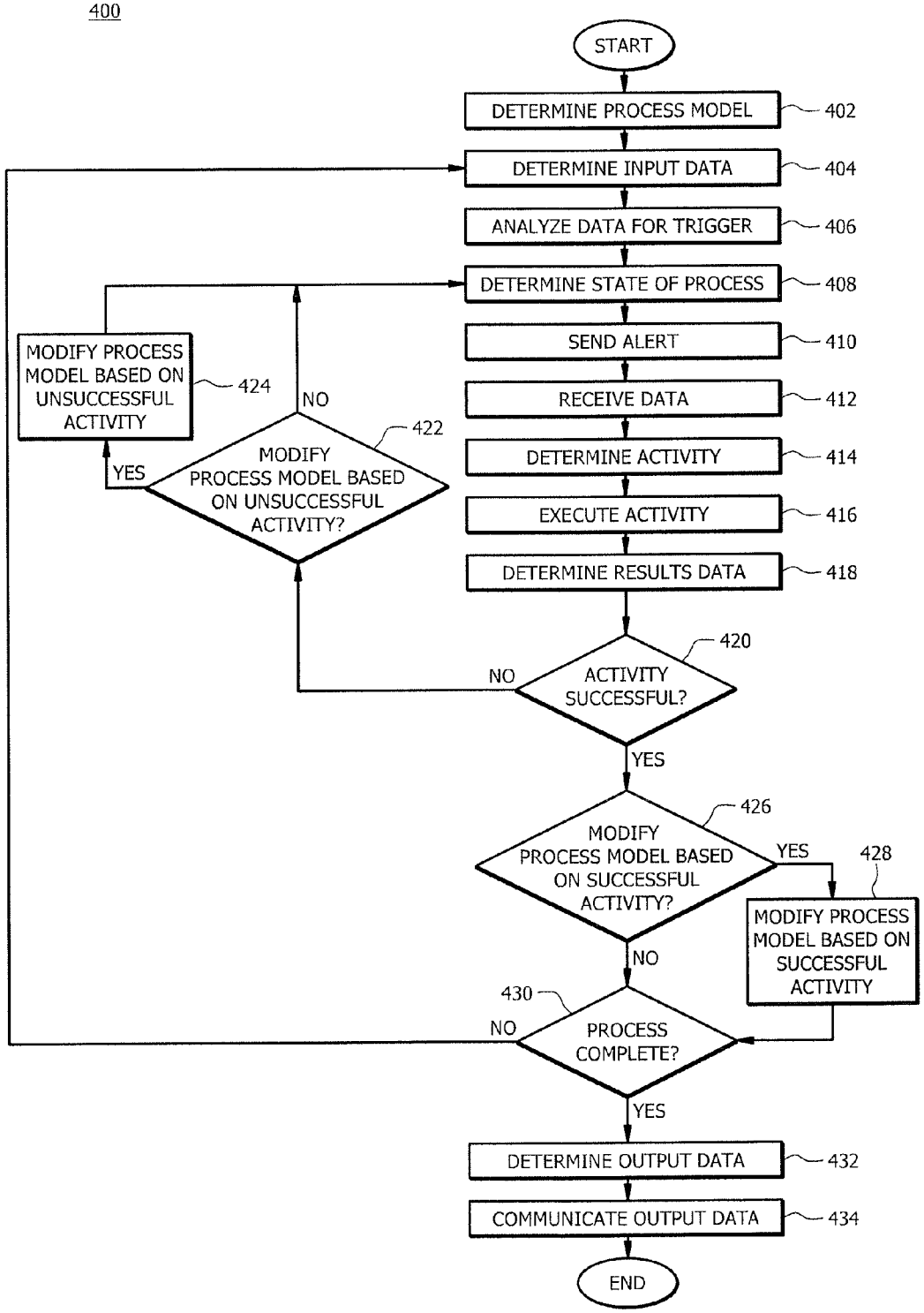
FIG. 4 illustrates a flowchart of an example method of digital process management, including example steps of executing a process model, which may be used, for example, in the systems illustrated in FIGS. 1-3 and/or in the methods illustrated in FIGS. 5 and 6, according to a particular embodiment.

FIG. 4 illustrates a flowchart of an example method 400 of digital process management, including example steps of executing a process model, according to a particular embodiment. In certain embodiments, one or more steps of method 400 may be performed by components of system 100 of FIG. 1, system 200 of FIG. 2, and/or system 300 of FIG. 3. One or more steps of method 400 may also be incorporated into all or part of method 500 of FIG. 5 and/or method 600 of FIG. 6.

Method 400 begins at step 402. At step 402, a process model (e.g., process models 116, 216, and/or 236) is determined. In certain embodiments, a process model may be associated with at least one digital process management system (DPMS). In other embodiments, a process model may comprise some or all of the general steps of data input, analysis and/or activity, and data output. In particular embodiments, a process model may comprise one or more sets of rules, wherein such sets of rules may relate to managing a process, including, in certain embodiments, managing a state of a process and/or data associated with a process. The sets of rules may call for certain activities and/or analysis to occur depending on a state of a process. In some embodiments, a process model may be determined, in whole or in part, by one or more components of systems 100, 200, and/or 300. Additionally, a process model may be determined, in whole or in part, by one or more enterprises 222. A process model may also be determined, in whole or in part, by a user of one or more components of systems 100, 200, and/or 300. In particular embodiments, a user may be, for example, a user of one or more devices 102 or gateway 202, a company or other entity, one or more people acting through social media 250, and/or any other user suitable to determine or customize all or part of a process model. A process model may also be determined, in whole or in part, by the execution of a different process model. In some embodiments, a process model may be determined, in whole or in part, by modifying the process model according to the process model and/or a different process model.

At step 404, input data is determined. In certain embodiments, input data may comprise data received from a data source, for example, data sources 118, data sources 218, cloud data 240, social media 250, data or input from a user or enterprise, data from network 120, and/or any other data source, whether or not a component of systems 100, 200, and/or 300. For example, a gateway 202 may determine input data based on data received from one or more devices 102. In addition, the data received from the one or more devices 102 may comprise (or be based on) data from a data source. In particular embodiments, input data may be determined by transforming, editing, and/or processing data from a data source. Input data may also be determined, in whole or in part, by a process model.

At step 406, data is analyzed to identify a trigger. In some embodiments, a trigger may represent one or more conditions, events, data and/or other occurrences that, once it occurs, indicates that execution of all or part of a process model should begin. For example, a process model may have a certain location as a trigger, such that when a user, device 102, gateway 202, etc. passes in or out of the certain location, execution of all or part of a process model is triggered. In particular embodiments, one or more triggers may be used to determine a process model, such as in step 402. In some embodiments, a process model may comprise one or more triggers. Additionally, one or more triggers may not be comprised in a process model.

At step 408, a state of a process is determined. In particular embodiments, a state of a process may be determined based on a process model, for example, the process model determined at step 402. In some embodiments, a state of a process may comprise identification of a particular step and/or status of a process. Additionally, a state of a process may comprise identification of a current and/or pending step and/or status of a process. A state of a process may also comprise a past state of a process, a present state of a process, and/or a future state of a process. Furthermore, a state of a process may be determined by any components of systems 100, 200, and/or 300. In other embodiments, a state of a process may be determined by a user or other entity.

At step 410, an alert is sent. In particular embodiments, an alert may comprise data sent to and/or from any component of systems 100, 200, and/or 300. In certain embodiments, an alert may relate to and/or comprise data regarding a state of a process (e.g., a state of a process as determined in step 408). An alert may also comprise data sent to a user or other entity. For example, a user might receive an alert as a text message to device 102. Additionally, an alert may also include a signal to an actuator (e.g., actuator 108, 208, 228, and/or 308) to perform a physical or non-physical action, collate data from an action performed, send data back to the process model, and/or update the state of the process and/or process model.

At step 412, data is received. In some embodiments, data received may comprise data sent to and/or from any component of systems 100, 200, and/or 300. In other embodiments, data received may comprise data created and/or communicated in response to the alert of step 410. Data received may also comprise data relating to and/or associated with the alert of step 410. Additionally, data received may comprise data related to customizing and/or modifying all or some of a process model, for example, the process model determined in step 402. In particular embodiments, received data may comprise data received from a data source, for example, data sources 118, data sources 218, cloud data 240, social media 250, data or input from a user or enterprise, data from network 120, and/or any other data source, whether or not a component of systems 100, 200, and/or 300.

At step 414, an activity is determined. In certain embodiments, an activity may comprise analyzing data, running a program, taking a physical action, sending a signal (electronic or otherwise), processing a transaction, offering a product for sale, modifying a product, performing a process or task, and/or any other activity. In particular embodiments, an activity may be determined based on a process model, for example, the process model determined in step 402. In other embodiments, an activity may be determined based on a set of rules, for example, a set of rules related to the process model determined in step 402. Additionally, an activity may be determined based on a state of a process, for example, the state of the process determined in step 408.

At step 416, an activity is executed. In some embodiments, the activity of step 414 may be executed. Executing an activity may comprise any set of actions or steps suitable for executing an activity. For example, if an activity comprises notifying a user of a new product and/or service, executing the activity may comprise displaying an advertisement of the new product and/or service on a device 102, gateway 202, and/or any other suitable component or device. An activity may also be executed based on a process model, for example, the process model determined in step 402.

At step 418, results data is determined. In certain embodiments, results data may be determined based on one or more results of an executed activity (or an attempted execution of an activity). Results data may be determined by analyzing the effects of an executed activity (or an attempted execution of an activity). In particular embodiments, sensor 110 may collect results data. Additionally, results data may be based on data from any other component of systems 100, 200, and/or 300.

At step 420, it is determined whether the activity of step 418 was successful. If the activity was unsuccessful, method 400 continues to step 422. If the activity was successful, method 400 continues to step 426. In some embodiments, an activity may be successful if the activity is executed according to a process model and/or produces results acceptable to, for example, a user and/or a process model. Alternatively, an activity may be unsuccessful if the activity is not executed according to a process model, and/or does not produce results acceptable to, for example, a user and/or a process model.

At step 422, if it is determined in step 420 that the activity of step 418 was unsuccessful, it may be determined whether to modify a process model (e.g., the process model determined in step 402) based on the unsuccessful activity. If the process model is to be modified, method 400 continues to step 424. If the process model is not to be modified, method 400 continues to step 408.

At step 424, if it is determined in step 422 that a process model is to be modified, then a process model (e.g., the process model determined in step 402) may be modified based upon the unsuccessful activity. In particular embodiments, the process model being modified may be modified based upon criteria other than the unsuccessful activity. The process model may also be modified based on results data, such as the results data from step 418. In addition, the process model may also be modified based on the process model itself and/or other process models. Modifications to the process model may include any changes, for example, removing, adding, or modifying a portion of the process model, changing triggers, changing process steps, changing the order of process steps, changing one or more activities associated with the process model, etc. Once the process model is modified, method 400 continues to step 408.

At step 426, if it is determined in step 420 that the activity of step 418 was successful, it may be determined whether to modify a process model (e.g., the process model determined in step 402) based on the successful activity. If the process model is to be modified, method 400 continues to step 428. If the process model is not to be modified, method 400 continues to step 430.

At step 428, if it is determined in step 426 that the process model is to be modified, then a process model (e.g., the process model determined in step 402) may be modified based upon the successful activity. In particular embodiments, the process model being modified may be modified based upon criteria other than the successful activity. The process model may also be modified based on results data, such as the results data from step 418. In addition, the process model may also be modified based on the process model itself and/or other process models. Modifications to the process model may include any changes, for example, removing, adding, or modifying a portion of the process model, changing triggers, changing process steps, changing the order of process steps, changing one or more activities associated with the process model, etc. Once the process model is modified, method 400 continues to step 430.

At step 430, it is determined whether a process (e.g., the process being managed by the process model determined in step 402, and/or the process of step 408) is complete. In certain embodiments, a processor, such as processors 106, 206, 226, and/or 306, any other component of systems 100, 200, and/or 300, and/or a user or other entity may determine whether the process is complete based on a process model and/or results data (e.g., the results data of step 418). If the process is not complete, method 400 continues to step 404. Thus, a process model (e.g., the process model determined in step 402) may repeat itself in this fashion, or in any other fashion, until the process is complete. The process model may also be modified, for example, as described in step 242, as it is repeated. If the process is complete, method 400 continues to step 432.

At step 432, output data is determined. In particular embodiments, output data is determined based on results data, such as the results data of step 418. Additionally, output data may be based on data from any other component of systems 100, 200, and/or 300.

At step 434, the output data determined at step 432 is communicated. In some embodiments, output data is communicated to any component of systems 100, 200, and/or 300. In addition, output data may be communicated to a user or to any other entity. Output data may also be processed and/or used as the basis for additional actions, taken and/or controlled, for example, by a digital process management system and/or a process model. For example, based on output data, a digital process management system and/or a process model may cause a user or other entity or component of systems 100, 200, and/or 300 to offer, cease to offer, or modify a product and/or a service In particular embodiments of method 400, a user, a system, and/or component of a system, such as systems 100, 200, and/or 300, may perform all steps, any step, or any part of a step. In addition, a user, system, and/or component of a system may cause an application to perform all steps, any step, or any part of a step. In certain embodiments of method 400, a process model could comprise some or all steps of method 400, either in the order and arrangement described or not.

The steps of method 400 are given as example combinations of steps for digital process management, including example steps of executing a process model. Some of the steps may be performed in a different order, omitted, or repeated where appropriate. Additionally, one of skill in the art will recognize other combinations of steps, including additional steps, are possible without departing from the scope of the present disclosure.

Figure 5:
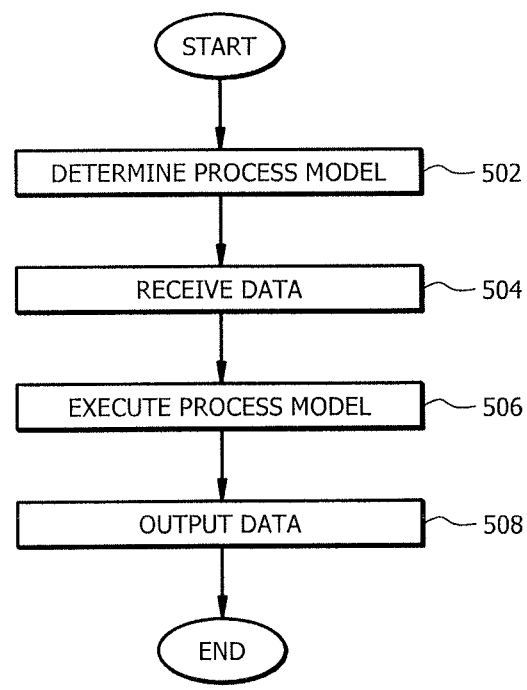
FIG. 5 illustrates a flowchart of an example method of digital process management, which may be used, for example, in the systems illustrated in FIGS. 1-3, according to a particular embodiment.

FIG. 5 illustrates a flowchart of an example method 500 of digital process management, according to a particular embodiment. In particular embodiments, one or more steps of method 500 may be performed by components of system 100 of FIG. 1, system 200 of FIG. 2, and/or system 300 of FIG. 3. Additionally, one or more steps of method 500 may be incorporated into all or part of method 400 of FIG. 4 and/or method 600 of FIG. 6.

Method 500 begins at step 502. At step 502, a process model (e.g., process models 116, 216, and/or 236) is determined. In certain embodiments, a process model may be associated with at least one digital process management system (DPMS). A process model may also comprise some or all of the general steps of data input, analysis and/or activity, and data output. In addition, a process model may comprise one or more sets of rules, wherein such sets of rules may relate to managing a process, including, in certain embodiments, managing a state of a process and/or data associated with a process. In particular embodiments, the sets of rules may call for certain activities and/or analysis to occur depending on a state of a process. In other embodiments, a process model may be determined, in whole or in part, by one or more components of systems 100, 200, and/or 300. Additionally, a process model may be determined, in whole or in part, by one or more enterprises 222.

In certain embodiments, a process model may be determined, in whole or in part, by a user of one or more components of systems 100, 200, and/or 300. In other embodiments, a user may be, for example, a user of one or more devices 102 or gateway 202, a company or other entity, one or more people acting through social media 250, and/or any other user suitable to determine or customize all or part of a process model. A process model may also be determined, in whole or in part, by the execution of a different process model. In addition, a process model may be determined, in whole or in part, by modifying the process model according to the process model and/or a different process model.

At step 504, data is received. In particular embodiments, data received may comprise data sent to and/or from any component of systems 100, 200, and/or 300. In certain embodiments, data received may comprise data related to customizing and/or modifying all or some of a process model, for example, process models 116, 216, 236, and/or 316. Additionally, received data may comprise data received from a data source, for example, data sources 118, data sources 218, cloud data 240, social media 250, data or input from a user or enterprise, data from network 120, and/or any other data source, whether or not a component of systems 100, 200, and/or 300. Received data may also be used to determine input data, for example, as described in step 404 of method 400.

At step 506, a process model (e.g., the process model determined in step 502) is executed. In certain embodiments, one or more components of systems 100, 200, and/or 300 may comprise a process model, such as process models 116, 216, 236, and/or 316. A process model generally comprises logic, rules, algorithms, code, tables, and/or other suitable instructions for executing any suitable functions regarding a digital process management system. In particular embodiments, a process model may be executed to perform digital process management, in whole or in part. A process model may comprise logic, rules, algorithms, code, tables, and/or other suitable instructions for managing the state of a process. In certain embodiments, a process model may be executed across multiple enterprises 222, in whole or in part. Additionally, a process model may be executed across (1) one or more devices, such as devices 102, (2) one or more gateways, such as gateway 202, (3) one or more enterprises, such as enterprise 222, and/or (4) one or more other components, systems, or entities connected to network 120. Executing a process model may comprise executing some or all of the general steps of data input, analysis and/or activity, and data output, for example, steps 504, 506, and/or 508 of method 500. As an additional example, executing a process model may comprise some or all of the steps of method 400. In certain embodiments, executing a process model may comprise executing a set of rules. Additionally, executing a process model may comprise some or all of determining a state of a process, determining an activity based on the state of the process and a set of rules, and executing the activity, among other steps.

At step 508, data is output. Data output may also be referred to as "output data." In particular embodiments, output data may be determined, for example, as in step 432 of method 400. Additionally, output data may be communicated, for example, as in step 434 of method 400. Output data may also be processed and/or used as the basis for additional actions, taken and/or controlled, for example, by a digital process management system, a process model, or any other system or process. For example, based on output data, a digital process management system and/or a process model may cause a user or other entity or component of systems 100, 200, and/or 300 to offer, cease to offer, or modify a product and/or a service. As additional examples, output data (and or process models generally) may be used to (1) offer suggestions and solutions to customers, (2) negotiate deals with providers and/or provide custom deals to customers, (3) track order fulfillment, (4) conduct and/or enable payments, (5) track product or service feedback, (6) analyze buying behaviors and/or feedback, (7) cross sell and/or up sell, (8) identify intermediaries to bypass in conducting a process and/or providing a service or product, and/or (9) provide feedback based on aggregated consumer feedback.

Method 500, generally, may be used to conduct digital process management, including executing a process model. One such example is a bank by your side (BBYS) application that offers various digital process management services. BBYS allows a bank to leverage Internet-of-things (IOT) device technology (and, e.g., devices 102, gateways 202, and/or enterprises 222) to become a provider, aggregator, and advisor to its customers and/or business partners. Using BBYS, a bank may move beyond traditional activities such as storing and enhancing wealth or enabling payments to becoming an aggregator of services, a storer of information, and a customer companion to facilitate the purchase of goods and services while aggregating information to develop a network of businesses, products, services, etc. Additionally, a bank may become an intermediary to any transaction a customer makes, as exchange of money is a key to nearly every transaction in a customer's life. A bank may leverage its primary function of facilitating the transfer of money to create value-added services by, for example (1) leveraging IOT devices to track customer needs, (2) offering suggestions and/or solutions to customers and/or businesses, (3) negotiating deals with providers, (4) tracking fulfillment, (5) enabling payments, and/or (6) track service feedback. In addition, a bank may leverage its primary function to become a business-to-business hub of aggregated goods and services providers by leveraging consumer data and provider data to offer more value-added services to customers and/or providers. For example, a bank may conduct the following to facilitate its business-to-business hub functions: (1) analyze buying behavior and feedback, (2) negotiate deals with providers and offer custom deals to customers, (3) conduct cross sell and up sell campaigns, (4) eliminate intermediaries and make it cheaper for customer to do transactions, (5) eliminate non-value-added effort and time from a customer's day to focus on more important or useful tasks, and/or (6) offer product advice to businesses based on aggregated customer feedback. The process model for BBYS may be executed across the device (e.g., device 102) level, the gateway (e.g., gateway 202) level, and/or the enterprise (e.g., enterprise 222) level. The table below describes an example of one or more process models, including key process steps and various services (i.e., actions/analysis) offered by the BBYS application.

TABLE 1

Example of Key Processes and Associated Bank Services Provided through BBYS Application

| Track → | Enquire → | Order → | Pay → | Service → | Business To Business Arrangements |
|---|---|---|---|---|---|
| Location Transaction Groups Social media Connected devices Inventory/ supplies Body/health parameters | Quotes Opinions/ ratings Price Availability Community feedback Recommend Deals and discounts Negotiate | Manage ordering Schedule Quantity Quality Track delivery | Make payment Provide credit Peer-to-peer adjustment Recommend options for finance | Post service feedback Gather data Aggregate data Analyze trends Offer intelligence (trends, behaviors, clusters, segments) to providers | Negotiate deals Cross sell/up sell Campaigns Co-branded offers |

In particular embodiments of method 500, a user, a system, and/or component of a system, such as systems 100, 200, and/or 300, may perform all steps, any step, or any part of a step. In certain embodiments, a user, system, and/or component of a system may cause an application to perform all steps, any step, or any part of a step.

The steps of method 500 are given as example combinations of steps for digital process management. Some of the steps may be performed in a different order, omitted, or repeated where appropriate. Additionally, one of skill in the art will recognize other combinations of steps, including additional steps, are possible without departing from the scope of the present disclosure.

Figure 6:
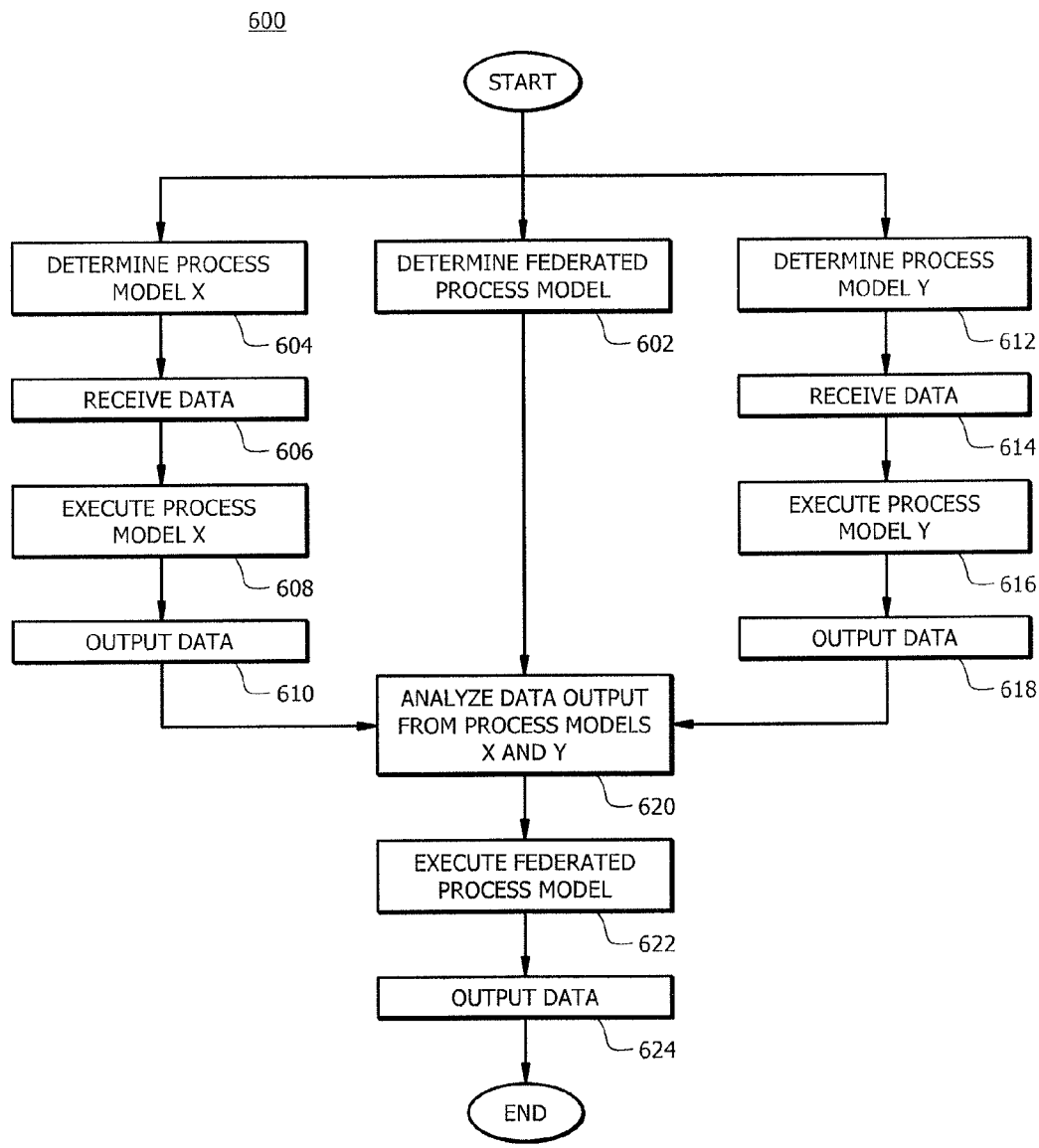
FIG. 6 illustrates a flowchart of an example method of federated digital process management, which may be used, for example, in the system illustrated in FIG. 3, according to a particular embodiment.

FIG. 6 illustrates a flowchart of an example method 600 of federated digital process management, according to a particular embodiment. In certain embodiments, one or more steps of method 600 may be performed by components of system 300 of FIG. 3, which may also comprise components of system 100 of FIG. 1 and/or system 200 of FIG. 2. Additionally, one or more steps of method 600 may be incorporated into all or part of method 400 of FIG. 4 and/or method 500 of FIG. 5.

Method 600 begins at step 602. At step 602, a federated process model (e.g., federated process model 316) is determined. In particular embodiments, a federated process model may be associated with at least one digital process management system (DPMS). In general, a federated process model (and/or any components of systems 100, 200, and/or 300) may assist in performing digital process management, and in particular may perform federated digital process management. A federated process model may also perform digital process management in response to one or more previous instances of digital process management. In certain embodiments, a federated process model may coordinate one or more instances of digital process management, wherein such coordination may comprise conducting a separate instance digital process management. Additionally, digital process management may include managing a process using a federated process model, which may include, for example, determining and conducting an activity based on the current state of a process being managed. For example, based on the state of a process regarding a customer's complaints regarding product X, a federated process model may cause a cessation of product X advertising to the customer and/or cause an initiation of product Y advertising to the customer. Furthermore, in this example, the federated process model may cause the cessation and/or the initiation by conducting the activity of modifying one or more process models (here, regarding advertising). In addition, such examples may apply to different industries, trade channels, product lines, etc.

In certain embodiments, a federated process model may comprise some or all of the general steps of data input, analysis and/or activity, and data output. A federated process model may also comprise one or more sets of rules, wherein such sets of rules may relate to managing a process, including, in certain embodiments, managing a state of a process and/or data associated with a process. In particular embodiments, the sets of rules may call for certain activities and/or analysis to occur depending on a state of a process. In other embodiments, a federated process model may be determined, in whole or in part, by one or more components of systems 100, 200, and/or 300. A federated process model may also be determined, in whole or in part, by one or more enterprises 222 and/or one or more FPMMs 302. Additionally, a federated process model may be determined, in whole or in part, by a user of one or more components of systems 100, 200, and/or 300. In particular embodiments, a user may be, for example, a user of one or more devices 102 or gateway 202, a company or other entity, an FPMM 302, one or more people acting through social media 250, and/or any other user suitable to determine or customize all or part of a federated process model. In these embodiments, the state of a process may be managed at the device level, the gateway level, the enterprise level, and/or at the FPMM, which may exist at any level. FPMM 302 may also manage the state of one or more processes occurring in one or more systems 200 and/or initiate and manage the state of a new process initiated in response to a previous instance of digital process management. In certain embodiments, a federated process model may be determined, in whole or in part, by the execution of a different process model. In addition, a federated process model may be determined, in whole or in part, by modifying the federated process model according to the federated process model and/or a different process model.

At step 604, process model X is determined. Step 604 may be substantially similar to step 502 of method 500.

At step 606, data is received. Step 606 may be substantially similar to step 504 of method 500.

At step 608, process model X is executed. Step 608 may be substantially similar to step 506 of method 500.

At step 610, data is output. Step 610 may be substantially similar to step 508 of method 500, including using output data as the basis for additional actions as described in step 508 of method 500.

Step 612 may be substantially similar to step 604 but is associated with a second process model, process model Y.

Step 614 may be substantially similar to step 606 but is associated with a second process model, process model Y.

Step 616 may be substantially similar to step 608 but is associated with a second process model, process model Y.

Step 618 may be substantially similar to step 610 but is associated with a second process model, process model Y.

At step 620, the output data from step 610 (associated with process model X) and step 618 (associated with process model Y) (collectively, "output data XY) is analyzed. In certain embodiments, at step 620, output data from a single digital process management system may be analyzed. Additionally, at step 620, output data from two or more digital process management systems may be analyzed. Output data XY (combined or X or Y individually) may also be treated as a data source, such as the data sources in step 404 of method 400. Thus, a federated process model may determine input data for the federated process based on output data XY. In addition, input data for a federated process may be determined as in step 404 of method 400. In particular embodiments, output data XY may be analyzed for triggers to initiate a federated process model.

At step 622, a federated process model is executed. Step 622 may be substantially similar to step 506 of method 500 and/or may comprise some or all of the steps of method 400 as applied to a federated process model. Thus, among the other steps of method 400, a federated process model may be modified in a manner similar to that described in method 400 (e.g., in steps 422, 424, 426, and/or 428). In addition, executing a federated process model may comprise and/or perform some or all of the functions, compositions, and uses of federated process models as described in step 602 of method 600.

At step 624, data is output. Step 624 may be substantially similar to step 508 of method 500, including using output data as the basis for additional actions as described in step 508 of method 500.

Method 600, generally, may be used to conduct federated digital process management, including executing a federated process model. One such example is a bank by your side (BBYS) application that offers various digital process management services across one or more process models. BBYS allows a bank to leverage Internet-of-things (IOT) device technology (and, e.g., devices 102, gateways 202, enterprises 222, and/or FPMMs 302) to become a provider, aggregator, and advisor to its customers and/or business partners. Using BBYS, a bank may move beyond traditional activities such as storing and enhancing wealth or enabling payments to becoming an aggregator of services, a storer of information, and a customer companion to facilitate the purchase of goods and services while aggregating information to develop a network of businesses, products, services, etc. Additionally, a bank may become an intermediary to any transaction a customer makes, as exchange of money is a key to nearly every transaction in a customer's life. A bank may leverage its primary function of facilitating the transfer of money to create value-added services by, for example (1) leveraging IOT devices to track customer needs, (2) offering suggestions and/or solutions to customers and/or businesses, (3) negotiating deals with providers, (4) tracking fulfillment, (5) enabling payments, and/or (6) track service feedback. In addition, a bank may leverage its primary function to become a business-to-business hub of aggregated goods and services providers by leveraging consumer data and provider data to offer more value-added services to customers and/or providers. For example, a bank may conduct the following to facilitate its business-to-business hub functions: (1) analyze buying behavior and feedback, (2) negotiate deals with providers and offer custom deals to customers, (3) conduct cross sell and up sell campaigns, (4) eliminate intermediaries and make it cheaper for customer to do transactions, (5) eliminate non-value-added effort and time from a customer's day to focus on more important or useful tasks, and/or (6) offer product advice to businesses based on aggregated customer feedback. The one or more process model(s) for BBYS may be executed across the device (e.g., device 102) level, the gateway (e.g., gateway 202) level, and/or the enterprise (e.g., enterprise 222) level, and may include one or more enterprises 222. The table below describes an example of one or more process models, including key process steps and various services (i.e., actions/analysis) offered by the BBYS application. While the same table is provided above regarding method 500, the process steps and services in this table also allow for federated digital process management when used in a manner consistent with method 600.

TABLE 2

Federated Example of Key Processes and Associated Bank Services Provided through BBYS Application

| Track → | Enquire → | Order → | Pay → | Service → | Business To Business Arrangements |
|---|---|---|---|---|---|
| Location Transaction Groups Social media Connected devices Inventory/ supplies Body/health parameters | Quotes Opinions/ ratings Price Availability Community feedback Recommend Deals and discounts Negotiate | Manage ordering Schedule Quantity Quality Track delivery | Make payment Provide credit Peer-to-peer adjustment Recommend options for finance | Post service feedback Gather data Aggregate data Analyze trends Offer intelligence (trends, behaviors, clusters, segments) to providers | Negotiate deals Cross sell/up sell Campaigns Co-branded offers |

The following is an additional example of BBYS executing a federated process model, which may be consistent with method 600. For example, a smart car may track gas (fuel) consumption, maintenance schedules, vehicle part conditions, driver health parameters while driving, driving behaviors, etc. A smart car may also have a BBYS module (which may comprise any and/or all components of systems 100, 200, and/or 300) that handles some or all of the processes, steps, or services listed in Table 2 and may also be configurable by a user (e.g., a driver or passenger). As a particular example, once a car requires maintenance or service, the car sends out a request for quotes to car dealers, receives quotes, analyzes and recommends a dealer based on dealer rating, costs, and proximity (based, e.g., on the car and the dealer's geographic location). A bank provides this information and service. A driver of the car can then schedule an appointment through a smart car panel and drop off his car. Upon completion of service, a notification is sent to the driver's smartphone. In response, the driver retrieves his car and approves payment on his smartphone. The bank processes the payment and collates feedback regarding one or more aspects of the service.

As another example of BBYS executing a federated process model, BBYS may track a driver's weight, blood pressure, heart rate, and/or other vital statistics while driving according to a process model, which includes communicating output data. Simultaneously, another process model may be monitoring the driver's driving, including communicating output data. Another process model (e.g., a federated process model) then analyzes both sets of output data searching for triggers. Upon finding one or more triggers, the process model executes actions consisting of: recommendations for music, notifications of nearby rest stops and/or restaurants, suggestions regarding exercise, and/or offers for medicines and/or services to assist improving the driver's overall health and/or driving performance.

In particular embodiments of method 600, a user, a system, and/or component of a system, such as systems 100, 200, and/or 300, may perform all steps, any step, or any part of a step. In certain embodiments, a user, system, and/or component of a system may cause an application to perform all steps, any step, or any part of a step.

The steps of method 600 are given as example combinations of steps for federated digital process management. Some of the steps may be performed in a different order, omitted, or repeated where appropriate. Additionally, one of skill in the art will recognize other combinations of steps, including additional steps, are possible without departing from the scope of the present disclosure.

Certain embodiments of the present disclosure may provide one or more technical advantages. For example, digital process management systems can help provision goods, services, and information in real time to users of IOT devices and/or gateways. Provisioning can occur in real time (or near-real time), because processes can be managed at or across the IOT device and/or gateway levels, as opposed to being batched and managed solely within an enterprise. In addition, digital process management systems improve the functionality of IOT devices, gateways, and enterprises by bringing process management closer to users. Thus, users may modify process models directly, and in some cases may manage processes without the delay or reduced customizability of enterprise input or control. Furthermore, digital process management may reduce network traffic and/or processing demands, as less data may need to be sent to and from enterprises to enable process management.

In addition, digital process management systems enable process automation, where processes are executed using modifiable and updatable process models that are executed and updated across the device, gateway, and/or enterprise levels. DPMSs also open the door to federated digital process management, which, for example, may allow for the executions of a first process model to affect the execution of a second process model, wherein the second process model may deal with a separate value chain or industry than the first process model. Such federated digital process management may create, for example, better-targeted advertisement, improved customer service, and other benefits that may result in decreased costs, increased revenue, and/or increased customer good will and loyalty.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system, comprising:
at least one memory operable to store:
input data associated with at least one digital process management system (DPMS);
output data associated with the at least one DPMS; and
a process model associated with the at least one DPMS; and
at least one processor communicatively coupled to the at least one memory and operable to:
determine the process model based at least in part upon input received from a user, wherein the process model comprises a set of rules;
determine the input data based at least in part upon data received from a data source;
determine, based at least in part upon the input data, whether to initiate the process model;
execute the process model, wherein executing the process model comprises:
executing the process model across two of an Internet-connected device, a gateway, and an enterprise wherein:
the gateway comprises one of a wired router, wireless router, server, tablet computer, laptop computer, desktop computer, and smartphone; and
the enterprise comprises an entity associated with the process model;
determining a state of a process;
determining a first activity based at least in part upon the state of the process and the set of rules;
executing the first activity;
determining results data, wherein the results data is based at least in part upon a result of the executed first activity; and
determining the output data, wherein the output data is based at least in part upon the results data; and
communicate the output data to the at least one memory;
the at least one memory is further operable to store:
federated input data associated with the at least one DPMS;
federated output data associated with the at least one DPMS; and
a federated process model associated with the at least one DPMS; and the at least one processor is further operable to:
  determine the federated process model based at least in part upon the output data and input received from an enterprise, wherein:
    the federated process model comprises a second set of rules; and
    the enterprise comprises an entity associated with the federated process model;
  determine the federated input data based at least in part upon the output data;
  determine, based at least in part upon the federated input data, whether to initiate the process model;
  execute the federated process model, wherein executing the federated process model comprises:
    determining a state of a second process;
    determining a second activity based at least in part upon the state of the second process and the second set of rules;
    executing the second activity;
    determining federated results data, wherein the federated results data is based at least in part upon a result of the executed second activity; and
    determining the federated output data, wherein the federated output data is based at least in part upon the federated results data; and
  communicate the federated output data to the at least one memory;
  wherein:
    executing the first activity comprises offering, ceasing to offer, or modifying one of a first product and a first service;
    executing the second activity comprises offering, ceasing to offer, or modifying one of a second product and a second service; and
    the one of the first product and the first service is not the same as the one of the second product and the second service.

2. The system of claim 1, wherein:
the process model is executed across the Internet-connected device and the gateway; and
the gateway is communicatively coupled to the Internet-connected device.

3. The system of claim 2, wherein:
the process model is further executed across the enterprise; and
the gateway and the enterprise are communicatively coupled to one another.

4. The system of claim 1, wherein:
the process model is executed across the gateway and the enterprise; and
the gateway and the enterprise are communicatively coupled to one another.

5. The system of claim 1, wherein:
the one of the first product and the first service is associated with a first enterprise; and
the one of the second product and the second service is associated with a second enterprise.

6. One or more non-transitory computer-readable media comprising logic, the logic when executed by one or more processors operable to perform operations comprising:
  storing input data associated with at least one digital process management system (DPMS);
  storing output data associated with the at least one DPMS;
  storing a process model associated with the at least one DPMS;
  determining the process model based at least in part upon input received from a user, wherein the process model comprises a set of rules;
  determining the input data based at least in part upon data received from a data source;
  determining, based at least in part upon the input data, whether to initiate the process model;
  executing the process model, wherein executing the process model comprises:
    executing the process model across two of an Internet-connected device, a gateway, and an enterprise wherein:
      the gateway comprises one of a wired router, wireless router, server, tablet computer, laptop computer, desktop computer, and smartphone; and
      the enterprise comprises an entity associated with the process model;
    determining a state of a process;
    determining a first activity based at least in part upon the state of the process and the set of rules;
    executing the first activity;
    determining results data, wherein the results data is based at least in part upon a result of the executed first activity; and
    determining the output data, wherein the output data is based at least in part upon the results data; and
  communicating the output data to the memory;
the at least one memory is further operable to store:
  federated input data associated with the at least one DPMS;
  federated output data associated with the at least one DPMS; and
  a federated process model associated with the at least one DPMS; and
the media is further operable when executed to perform operations comprising:
  determining the federated process model based at least in part upon the output data and input received from an enterprise, wherein:
    the federated process model comprises a second set of rules; and
    the enterprise comprises an entity associated with the federated process model;
  determining the federated input data based at least in part upon the output data;
  determining, based at least in part upon the federated input data, whether to initiate the process model;
  executing the federated process model, wherein executing the federated process model comprises:
    determining a state of a second process;
    determining a second activity based at least in part upon the state of the second process and the second set of rules;
    executing the second activity;
    determining federated results data, wherein the federated results data is based at least in part upon a result of the executed second activity; and
    determining the federated output data, wherein the federated output data is based at least in part upon the federated results data; and
  communicating the federated output data to the at least one memory;
  wherein:
    executing the first activity comprises offering, ceasing to offer, or modifying one of a first product and a first service;

executing the second activity comprises offering, ceasing to offer, or modifying one of a second product and a second service; and the one of the first product and the first service is not the same as the one of the second product and the second service.

7. The media of claim 6, wherein:

the process model is executed across the Internet-connected device and the gateway; and the gateway is communicatively coupled to the Internet-connected device.

8. The media of claim 7, wherein:

the process model is further executed across the enterprise; and the gateway and the enterprise are communicatively coupled to one another.

9. The media of claim 6, wherein:

the process model is executed across the gateway and the enterprise; and the gateway and the enterprise are communicatively coupled to one another.

10. A method, comprising:

storing, by at least one memory:
- input data associated with at least one digital process management system (DPMS);
- output data associated with the at least one DPMS; and
- a process model associated with the at least one DPMS;

determining, by at least one processor, the process model based at least in part upon input received from a user, wherein the process model comprises a set of rules;

determining the input data based at least in part upon data received from a data source;

determining, based at least in part upon the input data, whether to initiate the process model;

executing, by the at least one processor, the process model, wherein executing the process model comprises:
- executing the process model across two of an Internet-connected device, a gateway, and an enterprise wherein:
  - the gateway comprises one of a wired router, wireless router, server, tablet computer, laptop computer, desktop computer, and smartphone; and
  - the enterprise comprises an entity associated with the process model;
- determining a state of a process;
- determining a first activity based at least in part upon the state of the process and the set of rules;
- executing the first activity;
- determining results data, wherein the results data is based at least in part upon a result of the executed first activity; and
- determining the output data, wherein the output data is based at least in part upon the results data; and communicating the output data to the memory;

storing, by the at least one memory:
- federated input data associated with the at least one DPMS;
- federated output data associated with the at least one DPMS; and
- a federated process model associated with the at least one DPMS; and determining, by the at least one processor, the federated process model based at least in part upon the output data and input received from an enterprise, wherein:
- the federated process model comprises a second set of rules; and
- the enterprise comprises an entity associated with the federated process model;

determining the federated input data based at least in part upon the output data;

determining, based at least in part upon the federated input data, whether to initiate the process model;

executing, by the at least one processor, the federated process model, wherein executing the federated process model comprises:
- determining a state of a second process;
- determining a second activity based at least in part upon the state of the second process and the second set of rules;
- executing the second activity;
- determining federated results data, wherein the federated results data is based at least in part upon a result of the executed second activity; and
- determining the federated output data, wherein the federated output data is based at least in part upon the federated results data; and communicating the federated output data to the at least one memory;

wherein:
- executing the first activity comprises offering, ceasing to offer, or modifying one of a first product and a first service;
- executing the second activity comprises offering, ceasing to offer, or modifying one of a second product and a second service; and
- the one of the first product and the first service is not the same as the one of the second product and the second service.

11. The method of claim 10, wherein:

the process model is executed across the Internet-connected device and the gateway; and the gateway is communicatively coupled to the Internet-connected device.

12. The method of claim 11, wherein:

the process model is further executed across the enterprise; and the gateway and the enterprise are communicatively coupled to one another.

13. The method of claim 10, wherein:

the process model is executed across the gateway and the enterprise; and the gateway and the enterprise are communicatively coupled to one another.

14. The method of claim 10, wherein:

the one of the first product and the first service is associated with a first enterprise; and the one of the second product and the second service is associated with a second enterprise.

* * * * *